United States Patent
Nozaki et al.

(10) Patent No.: US 8,159,561 B2
(45) Date of Patent: Apr. 17, 2012

(54) DIGITAL CAMERA WITH FEATURE EXTRACTION DEVICE

(75) Inventors: Hirotake Nozaki, Koto-ku (JP); Yasuyuki Motoki, Kawasaki (JP); Hideo Hibino, Yamato (JP); Toshiaki Maeda, Yokohama (JP); Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 1902 days.

(21) Appl. No.: 10/954,613

(22) Filed: Oct. 1, 2004

(65) Prior Publication Data

US 2005/0088538 A1    Apr. 28, 2005

(30) Foreign Application Priority Data

Oct. 10, 2003   (JP) ................. 2003-351777
Oct. 10, 2003   (JP) ................. 2003-351778
Oct. 10, 2003   (JP) ................. 2003-351779

(51) Int. Cl.
*H04N 5/235*   (2006.01)

(52) U.S. Cl. ............. 348/231.6; 348/231.99; 348/231.2; 348/231.9

(58) Field of Classification Search ............... 348/229.1, 348/207.99, 349, 231.1–231.99; 382/159, 382/190
See application file for complete search history.

(56) References Cited

U.S. PATENT DOCUMENTS

| | | | | |
|---|---|---|---|---|
| 4,580,160 A | * | 4/1986 | Ochi et al. | 348/276 |
| 4,985,847 A | * | 1/1991 | Shioya et al. | 701/36 |
| 5,005,086 A | * | 4/1991 | Iwamoto et al. | 348/356 |
| 5,278,921 A | * | 1/1994 | Nakamura et al. | 382/167 |
| 5,347,371 A | * | 9/1994 | Nishimura et al. | 358/453 |
| 5,559,551 A | * | 9/1996 | Sakamoto et al. | 348/169 |
| 5,600,399 A | * | 2/1997 | Yamada et al. | 396/51 |
| 5,812,193 A | | 9/1998 | Tomitaka et al. | |
| 5,842,059 A | * | 11/1998 | Suda | 396/101 |
| 5,895,129 A | * | 4/1999 | Ohta | 396/79 |
| 5,920,644 A | * | 7/1999 | Fujimoto et al. | 382/159 |
| 5,982,912 A | * | 11/1999 | Fukui et al. | 382/118 |
| 6,005,974 A | * | 12/1999 | Kochi et al. | 382/190 |
| 6,167,200 A | * | 12/2000 | Yamaguchi et al. | 396/65 |
| 6,577,338 B1 | * | 6/2003 | Tanaka et al. | 348/207.2 |
| 6,650,362 B1 | * | 11/2003 | Nakamura et al. | 348/222.1 |
| 6,657,671 B1 | * | 12/2003 | Sasaki | 348/367 |
| 6,710,802 B2 | * | 3/2004 | Akahori et al. | 348/229.1 |

(Continued)

FOREIGN PATENT DOCUMENTS

EP          1 128 316 A1       8/2001

(Continued)

*Primary Examiner* — Tuan Ho
*Assistant Examiner* — Kent Wang
(74) *Attorney, Agent, or Firm* — Oliff & Berridge, PLC (57) ABSTRACT

This invention includes an imaging device that photographs a subject image, a first storage device that stores image data output from the imaging device at a first time interval, a display device that reads the image data stored in the first storage device at the first time interval and display the image data, a second storage device that reads the image data stored in the first storage device at a second time interval and stores the image data and a feature extraction device that extracts a feature section of the subject based upon the image data stored in the second storage device. Therefore, image data output from the imaging device for an image display is once stored in the second storage device and the feature section is extracted from the stored image data, so an extraction is not affected by an update of the first storage device.

15 Claims, 8 Drawing Sheets

U.S. PATENT DOCUMENTS

| | | | |
|---|---|---|---|
| 6,774,940 B1 * | 8/2004 | Ogura et al. | 348/231.99 |
| 6,819,356 B1 * | 11/2004 | Yumoto | 348/231.2 |
| 6,901,161 B1 * | 5/2005 | Wakashiro | 382/154 |
| 6,947,076 B1 * | 9/2005 | Kitaguchi et al. | 348/218.1 |
| 6,956,625 B2 * | 10/2005 | Kim | 348/806 |
| 7,027,082 B2 * | 4/2006 | Iida et al. | 348/92 |
| 7,108,375 B2 * | 9/2006 | Eguchi | 353/30 |
| 7,193,646 B1 * | 3/2007 | Shioji | 348/220.1 |
| 7,365,789 B2 * | 4/2008 | Ogino | 348/345 |
| 7,391,444 B1 * | 6/2008 | Nomura et al. | 348/239 |
| 7,391,463 B2 * | 6/2008 | Nonaka | 348/350 |
| 7,502,547 B2 * | 3/2009 | Abe et al. | 386/95 |
| 2001/0012246 A1 * | 8/2001 | Mitsuno | 369/32 |
| 2001/0012444 A1 * | 8/2001 | Ito et al. | 386/111 |
| 2001/0050709 A1 * | 12/2001 | Samejima et al. | 348/143 |
| 2002/0047922 A1 * | 4/2002 | Minami et al. | 348/500 |
| 2002/0101619 A1 * | 8/2002 | Tsubaki et al. | 358/302 |
| 2002/0145678 A1 * | 10/2002 | Suzuki et al. | 348/675 |
| 2002/0176610 A1 * | 11/2002 | Okazaki et al. | 382/118 |
| 2003/0122942 A1 * | 7/2003 | Parker et al. | 348/231.3 |
| 2003/0218685 A1 * | 11/2003 | Kawai | 348/340 |
| 2004/0012753 A1 * | 1/2004 | Udaka et al. | 349/187 |
| 2004/0041936 A1 * | 3/2004 | Uchiyama | 348/335 |
| 2004/0109243 A1 * | 6/2004 | Orimo et al. | 359/819 |
| 2004/0130632 A1 * | 7/2004 | Shiraishi | 348/223.1 |
| 2004/0183951 A1 * | 9/2004 | Lee | 348/652 |
| 2004/0223049 A1 * | 11/2004 | Taniguchi et al. | 348/14.02 |

FOREIGN PATENT DOCUMENTS

| | | |
|---|---|---|
| EP | 1 429 290 A2 | 6/2004 |
| JP | A 10-232934 | 9/1998 |
| JP | A 2001-201779 | 7/2001 |
| JP | A 2002-051255 | 2/2002 |
| JP | A 2002-333652 | 11/2002 |

* cited by examiner

DIGITAL CAMERA WITH FEATURE EXTRACTION DEVICE

INCORPORATION BY REFERENCE

This application is based upon and claims priority of Japanese Patent Applications No. 2003-351777 filed on Oct. 10, 2003, No. 2003-351778 filed on Oct. 10, 2003 and No. 2003-351779 filed on Oct. 10, 2003, the contents being incorporated herein by reference.

BACKGROUND OF THE INVENTION

1. Field of the Invention

The present invention relates to a digital camera that identifies a feature of a person and implements a focus and exposure actions responsive to a result of the identification.

2. Description of Related Art

Including an authentication system for verifying identity by checking a fingerprint or an iris that was registered in advance, many technologies that identify a person from image data have been known so far. Japanese Laid-Open Patent Application H9-251534 has described in detail an identification method in which an eye, nose and mouth etc are extracted and registered as a feature and then, identity is identified by comparing the registered feature with a feature extracted from input image data and Japanese Laid-Open Patent Application H10-232934 has disclosed a way to improve an accuracy of an image database dictionary when registering such the extracted feature. Some of examples in which these technologies have been applied to a camera will be given hereunder.

Japanese Laid-Open Patent Application 2001-201779 has disclosed that a camera user was registered as reference information and a camera action becomes enabled only when input identification information meets the registered reference information by photographing the camera user with a camera pointing at its face. Japanese Laid-Open Patent Application 2001-309225 has disclosed a camera in which data such as a face coordinate, face dimension, an eye position, a pause of a head and the like recognized in accordance with a face recognition algorithm is stored in an image memory along with image data. Japanese Laid-Open Patent Application 2001-326841 has also disclosed an imaging device (digital camera) that stores identification information (face, fingerprint and palm print) to identify an authentic user beforehand. Japanese Laid-Open Patent Application 2002-232761 has also disclosed an image storage device that stores a photographed image by linking the photographed image to previously read identification information about a subject. Japanese Laid-Open Patent Application 2002-333652 has disclosed an imaging device that generates a storage signal by comparing previously stored profile information with photographed face information. This profile information is stored in a priority order.

SUMMARY OF THE INVENTION

The conventional inventions as described above wherein technologies to identify a subject have been applied to a camera cause the conventional technologies used in a large-scale computer to become also usable in a camera itself, but on the other hand, when a picture is actually taken with a camera using an identification technology of a subject, an unprecedented action sequence as a camera becomes required.

With adoption of the foregoing new action sequence, a present invention is aimed at providing a digital camera having an easy-of-use subject identification function close to a conventional action sequence that has not been attained in a camera with a conventional subject identification function.

In order to solve the foregoing problem, one aspect of the invention includes an imaging device that photographs a subject image, a first storage device that stores image data output from the imaging device at a first time interval, a display device that reads the image data stored in the first storage device at the first time interval and display the image data, a second storage device that reads the image data stored in the first storage device at a second time interval and stores the image data and a feature extraction device that extracts a feature section of the subject based upon the image data stored in the second storage device. Namely, image data output from an imaging device for the image display is once stored in the second storage device and the feature section is extracted from the stored image data, so the extraction is not affected by an update of the first storage device.

The invention may further include directing device that directs to thin out image data and store the thinned-out image data such that the number of pixels of the image data makes the predetermined number of pixels determined by the number of display pixels of the display device when the image data output from the imaging device is stored in the first storage device. Namely, image data stored in the first storage device stores only image data of the small number of pixels responsive to the number of pixels of the display device, so processing on this image data can be quickly implemented.

The invention may further include a directing device that directs to store only predetermined scope on the second storage device out of image data stored in the first storage device when the image data read out from the first storage device is stored in the second storage device. With this, an extraction range is further specified, so an extraction action can be quickly implemented. The invention may further include that the first time interval and the second time interval are equal and the invention may further include that the first time interval is shorter than the second time interval.

The invention may further include an exposure computation device that computes an exposure when photographing a subject, wherein the exposure computation device implements an exposure computation with respect to a subject responsive to a feature section extracted by the feature extraction device. The invention may further include that the exposure computation device implements an exposure computation with respect to a subject responsive to the feature section extracted by the feature extraction device based upon image data output from the imaging device after completion of an extraction action by the feature extraction device.

The invention may further include a detection device that detects a color condition on a screen to be photographed, wherein the detection device detects a color condition on the screen after completion of an extraction action by the feature extraction device. The invention may further include that the detection device detects a color condition on the screen based upon image data output from the image-taking screen after completion of an extraction action by the feature extraction device.

The invention may further include a distance computation device that computes a distance up to a subject, wherein the distance computation device computes a distance up to a subject responsive to a feature section extracted by the feature extraction device after completion of an extraction action by the feature extraction device. The invention may further include that the distance computation device computes a distance up to a subject responsive to the feature section based upon image data output from the imaging device after completion of an extraction action by the feature extraction device.

The invention may include an imaging device that photographs a subject, a feature extraction device that extracts a feature section of the subject from image data output from the imaging device at a predetermined time interval, a distance computation device that computes a distance up to a subject and a directing device that directs the distance computation device to compute a distance up to the subject after the extraction device extracts a feature section of the subject with respect to image data output from the imaging device in accordance with an operation of a photo shooter. Namely, an extraction action is taken immediately when a photo shooter operates to start extracting a feature section and a distance computation is implemented with respect to an extracted subject after completion of the extraction, so a distance computation is surely implemented.

The invention may further include that the directing device directs the distance computation device to compute a distance up to the subject at a plurality of times during the predetermined time intervals, and the invention may further include an exposure computation device that computes an exposure when photographing the subject, wherein the directing device directs the exposure computation device to compute an exposure of the subject after the distance computation device completes computation of a distance up to the subject and the invention may further include a color detection device that detects a color condition on a screen to be photographed, wherein the directing device directs the color detection device to detect a color condition on the screen to be photographed after the distance computation device completes computation of a distance up to the subject.

The invention may include a feature extraction device that extracts a feature section of a subject at a predetermined time interval, an exposure computation device that computes an exposure when photographing a subject and a directing device that directs the exposure computation device to compute an exposure of the subject after the feature extraction device extracts a feature section of the subject with respect to image data output from the imaging device in accordance with an operation of a photo shooter. Namely, an extraction action is taken immediatley when a photo shooter operates to start extracting a feature section and an exposure computation is implemented with respect to an extracted subject after completion of the extraction, so the exposure computation is surely implemented.

The invention may include a color detection device that detects a color condition on a screen to be photographed, a feature extraction device that extracts a feature section of a subject at a predetermined time interval and a directing device that directs the color detection device to detect a color condition on a screen to be photographed after the feature extraction device extracts a feature section of the subject respect to image data output from the imaging device in accordance with an operation of a photo shooter. Namely, an extraction action is taken immediatley when a photo shooter operates to start extracting a feature section and a color condition is detected with respect to an extracted subject after completion of the extraction, so the color condition is surely detected.

The invention may include an imaging device that photographs a subject image passing through a image-taking lens, a setting device that sets an action mode to any of a feature extraction mode for extracting a feature section of a subject from image data output from the imaging device or other mode rather than the feature extraction mode and a drive device that drives the image-taking lens to a predetermined position when the setting device sets an action mode to the feature extraction mode. Namely, an image-taking lens is immediately driven to a preternined start position when an action mode is set to an extraction action mode and thereby a subject can be readily identified.

The invention may further include that the predetermined position is a position of a hyperfocal distance of the image-taking lens. Namely, by driving a taking lens to a position of a hyperfocal distance being at the nearest shooting distance where depth of field of the image-taking lens extends through infinity, a person is kept within the depth of field that is a acceptable sharp range in focus wherever a subject is positioned, so a person can be extracted quickly and surely.

The invention may further include that the predetermined position is a position of the image-taking lens of which a shooting distance is a specific distance ranging from 0.5 to 3 m and thus, the image-taking lens is driven to a fixed position not determined by a focal length and an aperture of the image-taking lens, so almost all persons can be focused on.

An aspect of the invention may include an imaging device that photographs a subject image passing through a image-taking lens, a diaphragm device that controls a light amount entering the imaging device, a setting device that sets an action mode to any of a feature extraction mode for extracting a feature section of a subject from image data output from the imaging device or other mode rather than the feature extraction mode and a diaphragm driver device that drives the diaphragm device to a predetermined aperture position when the setting device sets an action mode to the feature extraction mode. Namely, an aperture is immediately driven to a predetermined initial position when an action mode is set to an extraction action mode, so a subject can be readily identified. The invention may further include that the predetermined aperture position is the minimum aperture position settable by the diaphragm device, and the invention may further include that the predetermined aperture position is near the minimum aperture position settable by the diaphragm device. Namely, at a time of starting a normal shooting with no feature extraction, an aperture is set near the maximum aperture so that a detection of a focus position is made easier with an increase in a subject contrast. However, it is necessary that as many persons around a primary person as possible be recognized by deepening depth of field when a person is detected. Therefore, the depth of field is made deeper by setting the aperture to the minimum aperture or a value near the minimum aperture.

An aspect of the invention may include an imaging device that photographs a subject, a computation device that computes an exposure condition when photographing a subject, a feature extraction device that extracts a feature section of a subject from image data output from the imaging device, a setting device that sets an action mode to any of a feature extraction mode for extracting a feature section of a subject from image data output from the imaging device or other mode rather than the feature extraction mode and a directing device that directs the imaging device to photograph in accordance with a computation result of the computation device when the setting device sets an action mode to the feature extraction mode and the feature extraction device to extract a feature extraction action with respect to output image data. Namely, subject brightness is measured at a time of starting an extraction and an extraction action is implemented with respect to image data photographed in accordance with an exposure condition on a basis of the light measurement and thus, this prevent the extraction from being impossible due to overexposure or underexposure of the subject.

An aspect of the invention may include a feature extraction device that extracts a feature section of a subject from image data at a predetermined time interval, a setting device that sets an action mode to any of a feature extraction mode for extracting a feature section of a subject from image data output from the imaging device or other mode rather than the feature extraction mode, a distance measurement device that measures a distance up to a subject and a directing device that directs the distance measurement device to change action timing depending upon whether the feature extraction mode is set or the other mode is set. Namely, with a change in action timing of the distance measurement in other action mode rather than an extraction action mode, a comfortably ease-of-use digital camera can be provided. The invention may further include that the directing device directs the distance measurement device to measure a distance at a constant time interval when the setting device sets the action mode to the other mode rather than the feature extraction mode and thereby the distance measurement action to a subject is implemented periodically.

The invention may further include a judgment device that judges whether or not the feature extraction device can extract a feature section of the subject, wherein the directing device directs the distance measurement device to measure only when the judgment device judges that a feature section of the subject cannot be extracted when the setting device sets an action mode to the feature extraction mode. Namely, in an extraction action mode, a distance measurement action is configured to be implemented only when an extraction becomes impossible due to an excessive out-of-focus subject and thereby even when a plurality of subjects are moving back and forth, an image-taking lens does not move frequently, so a user does not feel discomfort. The invention may further include that the judgment device judges that a feature section of the subject cannot be extracted when the feature extraction device cannot extract consecutively a feature section of the subject at a plurality of times. The invention may further include a judgment device that judges whether or not the feature extraction device can extract a feature section of the subject, wherein the directing device directs the distance measurement device not to measure when the judgment device judges that a feature section of the subject can be extracted. Thus in this case, a frequent lens movement can be avoided.

An aspect of the invention may include a lens drive device that drives a image-taking lens photographing a subject, a feature extraction device that extracts a feature section of a subject from image data at a predetermined time interval, a setting device that sets information about a subject to be photographed beforehand, a judgment device that judges whether or not the feature extraction device can extract a feature section of the subject and a directing device that directs the lens drive device to change a drive method of the image-taking lens based upon a setting result of the setting device when the judgment device judges that a feature section of the subject cannot be extracted. Namely, a drive method of an image-taking lens is changed depending on whether or not the feature extraction device can extract and thereby a subject can be photographed in conformity with a shooting intention of a photo shooter.

The invention may further include that the information about the subject to be photographed is information on whether a shooting is with emphasis on a person or scenery.

The invention may further include that the directing device directs to drive the image-taking lens to a predetermined position set beforehand when a shooting with emphasis on a person is set by the setting device. Even when the image-taking lens stays at the nearest position or near infinity position, this enables to take a picture by moving the image-taking lens to a predetermined position set beforehand suitable for a portrait shooting.

According to at least one aspect of the invention, the predetermined position is a position of a hyperfocal distance of the image-taking lens, namely, the nearest shooting distance of the image-taking lens where infinity extends through depth of field of the image-taking lens. That is, wherever a subject is positioned, focusing is almost possible by putting the image-taking lens to the position of the hyperfocal distance and as a result, a person is extracted quickly and surely.

The invention may further include include a distance measurement device that measures a distance up to a subject, wherein the directing device directs to drive the image-taking lens to a position responsive to a distance measurement result of the distance measurement device when a shooting with emphasis on scenery is set by the setting device. Namely, when a person cannot be extracted and a shooting mode is set to a scenery-oriented shooting, a picture focused on scenery can be taken by photographing a subject at a position measured by the distance measurement device.

The invention may further include that the judgment device judges that a feature section of the subject cannot be extracted when a feature section of the subject cannot be extracted consecutively at a plurality of times.

An aspect of the invention may include a lens drive device that drives an image-taking lens, a feature extraction device that extracts a feature section of a subject from image data, a judgment device that judges whether or not the feature extraction device can extract a feature section of the subject and a setting device that sets a drive range of the image-taking lens by the lens drive device. Namely, a photo shooter can manipulate a camera with a comfortable operationality by changing a drive range of the image-taking lens depending upon whether an extraction is possible or impossible.

The invention may further include that the setting device sets a drive range of the image-taking lens to a predetermined range by the lens drive device when the judgment device judges that a feature section of the subject can be extracted, so the shooting distance never deviate overly in a frontward and backward directions.

The invention may further include a distance measurement device that measures a distance up to a subject, wherein the predetermined range is a predetermined range of the vicinity of a front and a back of the subject including a distance up to the subject first measured by the distance measurement device.

The invention may further include that the setting device sets a drive range of the image-taking lens by the lens drive device to an overall movable range of the image-taking lens when the judgment device judges that a feature section of the subject cannot be extracted.

An aspect of the invention may include a feature extraction device that extracts feature sections of a plurality of subjects from image data, an identification device that identifies a plurality of respective feature sections extracted by the feature extraction device based upon a predetermined judgment condition, an identification display device that displays an identification of a subject corresponding to a plurality of feature sections extracted by the feature extraction device based upon an identification result of the identification device, a selection device that selects a predetermined subject from a plurality of subjects displayed by the identification display device and a directing device that directs the identification display device not to display an identification responsive to an identification result of the identification device after the selection device selects the predetermined subject. Namely, once a desired subject is selected and an identification display is displayed, the subject is locked and thereby it becomes possible to easily lock on the selected subject once the subject is locked. The invention may further include a setting device that sets a vicinity of the subject selected by the selection device to a predetermined area, and the invention may further include that the predetermined area is a distance measurement area to measure a distance up to a subject and the invention may further include that the predetermined area is a light measurement area to measure subject brightness.

The invention may further include a detection device that detects a size of a feature section, wherein the identification device identifies a subject of a maximum size out of a plurality of subjects extracted by the feature extraction device responsive to a detection result of the detection device.

The invention may further include a detection device that detects a distance up to a feature section, wherein the identification device identifies a subject at the closest distance out of a plurality of subjects extracted by the feature extraction device responsive to a detection result of the detection device.

DETAILED DESCRIPTION OF THE PREFERRED EMBODIMENT

With reference to the accompanying drawings, embodiments of this invention will be hereinafter described.

Figure 1:
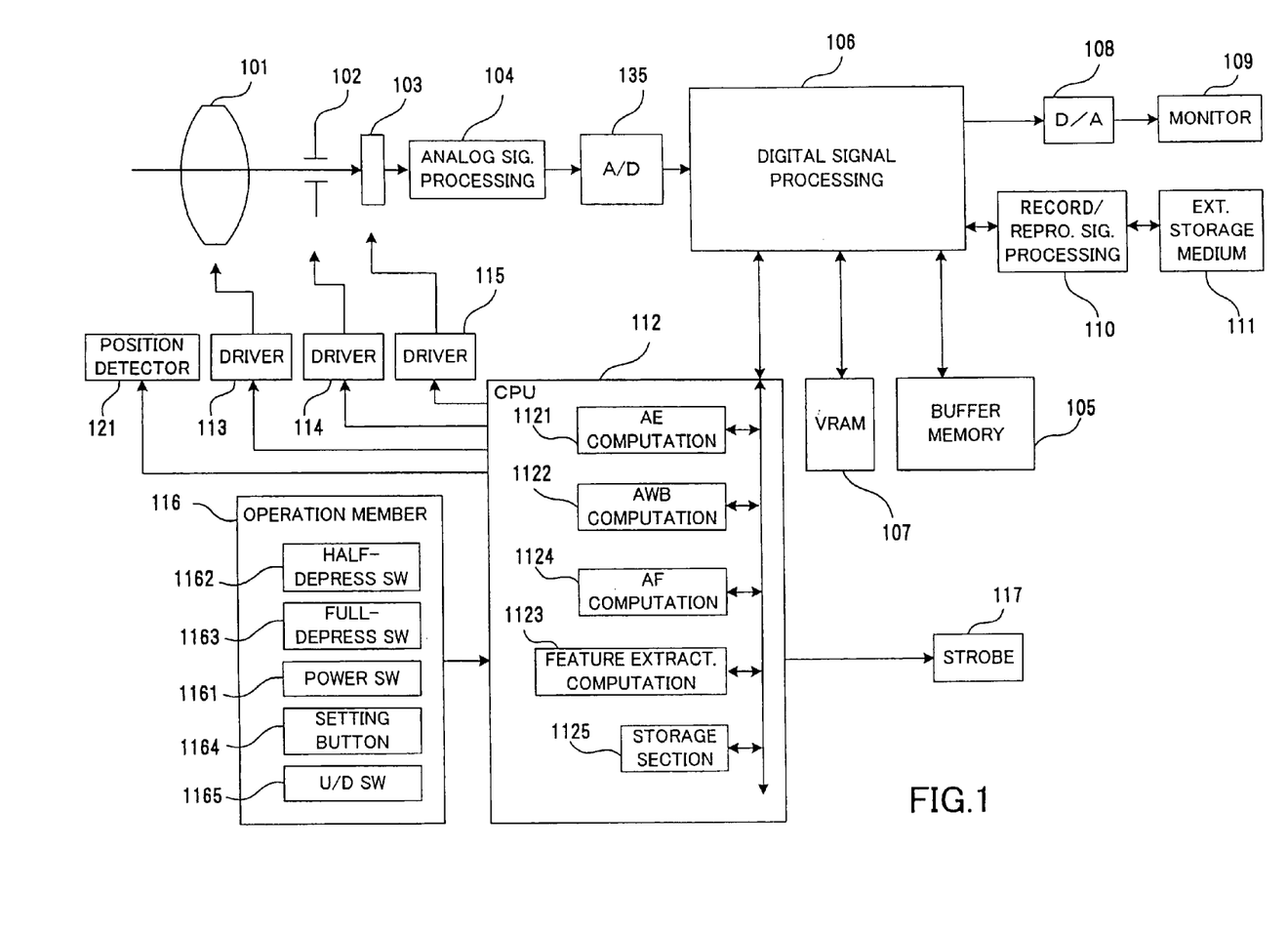
FIG. 1 represents a block diagram showing a configuration of a digital camera according to the present invention.
Figure 7:
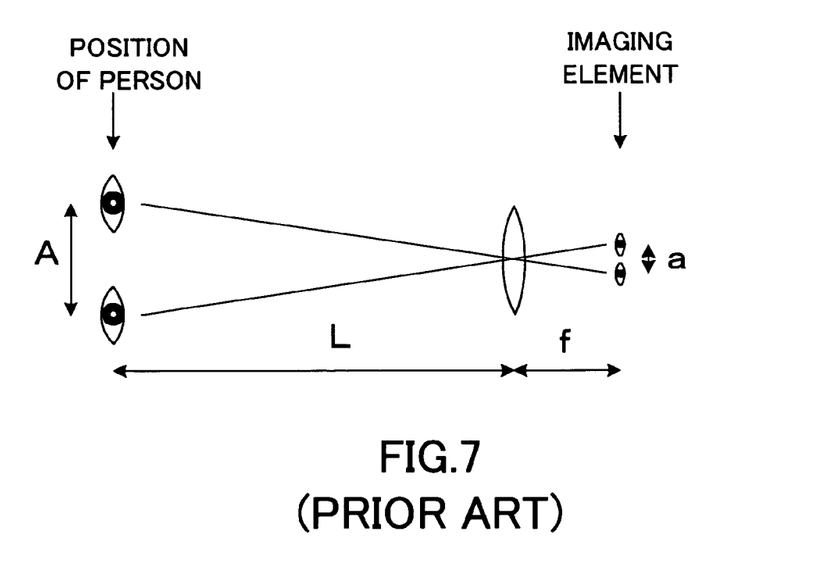
FIG. 7 represents an illustration expressing a lens focal length and a distance from width between eyes to a subject person.

FIG. 1 is a functional block view explaining a major function about a digital camera of this invention. Image-taking lens 101 includes a zoom lens that changes its focus distance continuously and a focus lens that adjusts a focus point. These lenses are driven by driver 113. Herein, driver 113 has a zoom drive unit and its drive circuit for the zoom lens and a focus drive unit and its drive circuit for the focus lens and these units and circuits are controlled by CPU 112. Image-taking lens 101 forms a subject image on an image-forming surface of imaging element 103. Imaging element 103 is a photoelectric element that outputs an electric signal responsive to a light intensity of the subject image formed on the image-forming surface and a CCD or MOS-type solid state imaging element is used. Image element 103 is driven by driver 115 that controls timing of extracting a signal. Diaphragm 102 is arranged between image-taking lens 101 and imaging element 103. Diaphragm 102 is driven by driver 114 that includes an aperture unit and its drive circuit. An imaging signal from solid imaging element 103 is input into analogue signal processing circuit 104 and then correlation double sampling (CDS) and the like is processed on the imaging signal by analogue signal processing circuit 104. The imaging signal processed by analogue signal processing circuit 104 is converted into a digital signal from an analogue signal by A/D converter 135.

Various image processing such as an edge enhancement, a gamma correction, a white balance correction and so are processed on the A/D converted signal by digital signal processing circuit 106. Buffer memory 105 is a frame memory capable of storing data for a plurality of frames imaged by imaging element 103 and the A/D converted signal is temporally stored in buffer memory 105. Digital signal processing circuit 106 implements the image processing by importing the data stored in buffer memory 105 and the post-processed data is stored again in buffer memory 105. CPU 112 is connected to digital signal processing circuit 106 and drivers 113 through 115 and executes a sequence control when a camera is operated. AE computation section 1121 of CPU 112 computes an exposure based upon an image signal from the imaging element and AWB computation section 1122 thereof computes to determine a parameter for a white balance. Feature-extraction-computation section 1123 of CPU 112 stores features like a shape, position, size etc of a subject from image data in accordance with a predetermined algorithm in storage section 1125 thereof and computes an extracted size such as a face, a width between eyes etc and rough distances to respective subjects extracted from focus distances of the zoom lens detected by detection device 121 and then stores the computed size and distances in storage section 1125 thereof with a day and time of the extraction. Herein, a way of computing this distance will be described using FIG. 7. FIG. 7 shows a case where a distance to a subject person is computed based upon an extracted width between eyes. A is an average value of real widths between eyes of a general adult, a an extracted width between eyes formed on the imaging element, L a distance from an image-taking lens to a subject person and f a focal length. From this figure, a following proportional expression can readily be obtained.

$$A/L = a/f$$

Thus, distance L to the subject person is $L=(A/a) \cdot f$. Such the extracted features and the computed distances to the features based upon the features are temporally stored in storage section 1125. A user selects features that the user is eager to keep from the stored features and can record the features.

An AF system in a digital camera of this invention employs a contrast method. Herein, an explanation about this contrast method will be given. There is a correlation between a degree of an out-of-focus image on imaging element 103 and its contrast and thereby a focus is adjusted by using that an image contrast becomes a maximum when the image comes into focus. A size of the contrast can be evaluated by a size of a high frequency component of an imaging signal. Namely, AF computation section 1124 extracts a high frequency component of an imaging signal and as a focus evaluation value that is a value which integrates an absolute value of the high frequency component, an AF computation is implemented based upon the focus evaluation value. CPU 112 causes a focus lens position of image-taking lens 101 to be adjusted and a focus action to be taken, using a computation result of AF computation section 1124.

In operation member 116 connected to CPU 116, there is provided power switch 1161 that turns a camera power on and off, half-depressing switch 1162 and full-depressing switch 1163 that turn on and off coupling with a release button, setting button 1164 that selects various menus to be used and be displayed on monitor display 109 at a time of a picture taking and up/down (U/D) button 1165 that updates a reproduction image etc and the like. Setting button 1164 also enables to select and set various characters to name the extracted features by using U/D button 1165. Other than the foregoing, U/D button 1165 is used to select a desired person from a plurality of extracted persons and drive the zoom lens manually toward a telephoto lens side or a wide-angle side when shooting.

When subject brightness is low, flash 117 is fired. In addition, this flash includes a pre-flash function that prevents a pupil of a person from being photographed in red when firing a flash or lessens a so-called red eye phenomenon when so fired and fires a supplementary flash beforehand prior to a shooting to measure subject brightness in advance at dim brightness. Not only information about the features as described before but also information about a peak value of an evaluation value detected from an AE computation result and a corresponding lens position and the like are stored in storage section 1125. The image data variously processed by digital signal processing circuit 106 is stored in external storage medium 111 like a memory card etc via record & reproduction signal processing circuit 110 after being temporally stored in buffer memory 105. When image data is stored in storage medium 111, the data is usually compressed in predetermined format, for example, JPEG format. Record & reproduction signal processing circuit 110 implements a data compression for storing image data in external storage medium 111 and a decompression process of the compressed image data reproduced from external storage medium 111.

Monitor display 109 is a liquid crystal display device (LCD) to display a photographed subject image and various setting menus when shooting or playing back. Herein, this monitor display is also used when playing back and displaying image data stored in storage medium 111. When an image is displayed on monitor display 109, image data stored in VRAM 107 that is a part of buffer memory 105 is extracted and digital image data is converted to an analogue picture image signal by D/A converter 108. Then, the image is displayed on monitor display 109 by using this analogue picture image signal.

Figure 6:
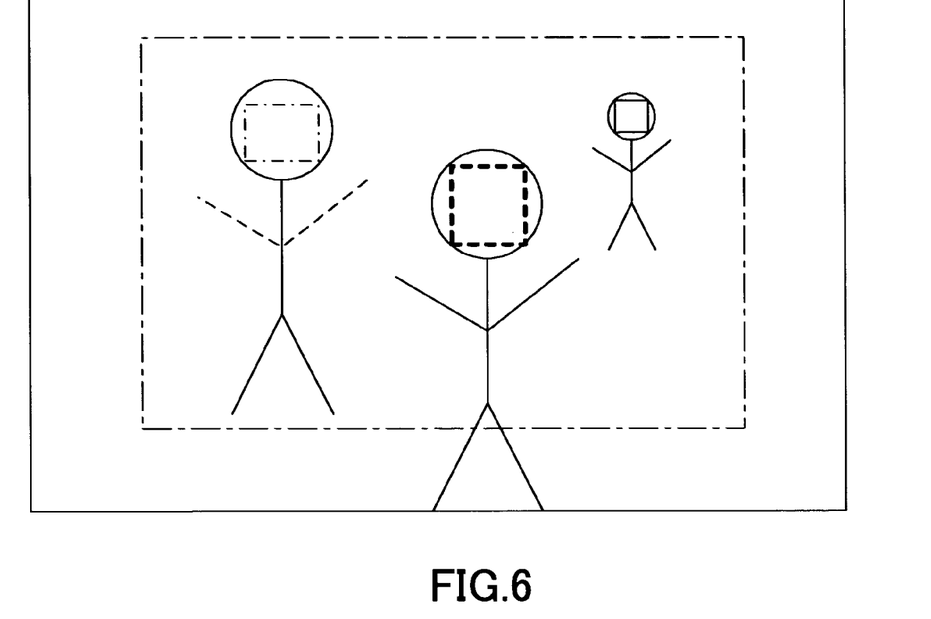
FIG. 6 represents a flow chart describing a sequence at a time of setting s shooting condition.

Herein, a relationship between buffer memory 105 and VRAM 107 when extracting features will be described. When image data for displaying is played back on monitor display 109, data for displaying that is thinned out from image data for a still image is continuously produced at a certain cycle (e.g. 30 f/sec.) from the imaging element. Then, the image data is given a predetermined process, and data thereof is further thinned out such that the number of pixels of the image data makes the number of pixels responsive to vertical and horizontal pixels of monitor display 109 and then this thinned-out data is continuously stored in VRAM 107. The data of VRAM 107 is played back as a display image on monitor display 109 through D/A converter 108. This image data of VRAM 107 is also used as data to extract features. When features are extracted, image data of VRAM 107 is stored again in buffer memory 105 at a predetermined timing. At this stage, only predetermined scope (e.g. 80% vertically and horizontally) at a center section of data stored in VRAM 107 is stored in buffer memory 105. FIG. 6 shows an example of this scope within a screen. In FIG. 6, an area indicated by a chain line inclusive of three persons within a display screen is a scope that is stored in buffer memory 105. As a subject on a marginal section outside this scope is likely not to be a primary subject and it is meaningless to extract features thereof, to shorten an extraction process time, features are extracted from only image data excluding the subject on the marginal section with feature-extraction computation section 1123 from the beginning. When a camera is set to an extraction mode for an extraction operation using setting button 1164 as described before, it is preferable that displaying of such the extractable scope can remind a user of the extraction mode.

The reason why image data is stored again in buffer memory 105 from VRAM 107 is as follows. If a processing power of CPU 112 were high, a feature extraction could be implemented at a rate of 30 f/sec., but the processing power of many CPUs employed in digital cameras on the market is not so high. Therefore, image data is stored again in buffer memory 105 from VRAM 107 at a rate matching a feature extraction computation corresponding to the processing power of CPU 112 and thereby the feature can be extracted. In this case, an image data for displaying is output at a normal rate from VRAM 107, so it is matter of course that a display and update rate do not get late. Anyway, AE and AF computations use image data that is output from imaging element 103, but is not yet thinned out for being stored in VRAM 107.

Figure 8:
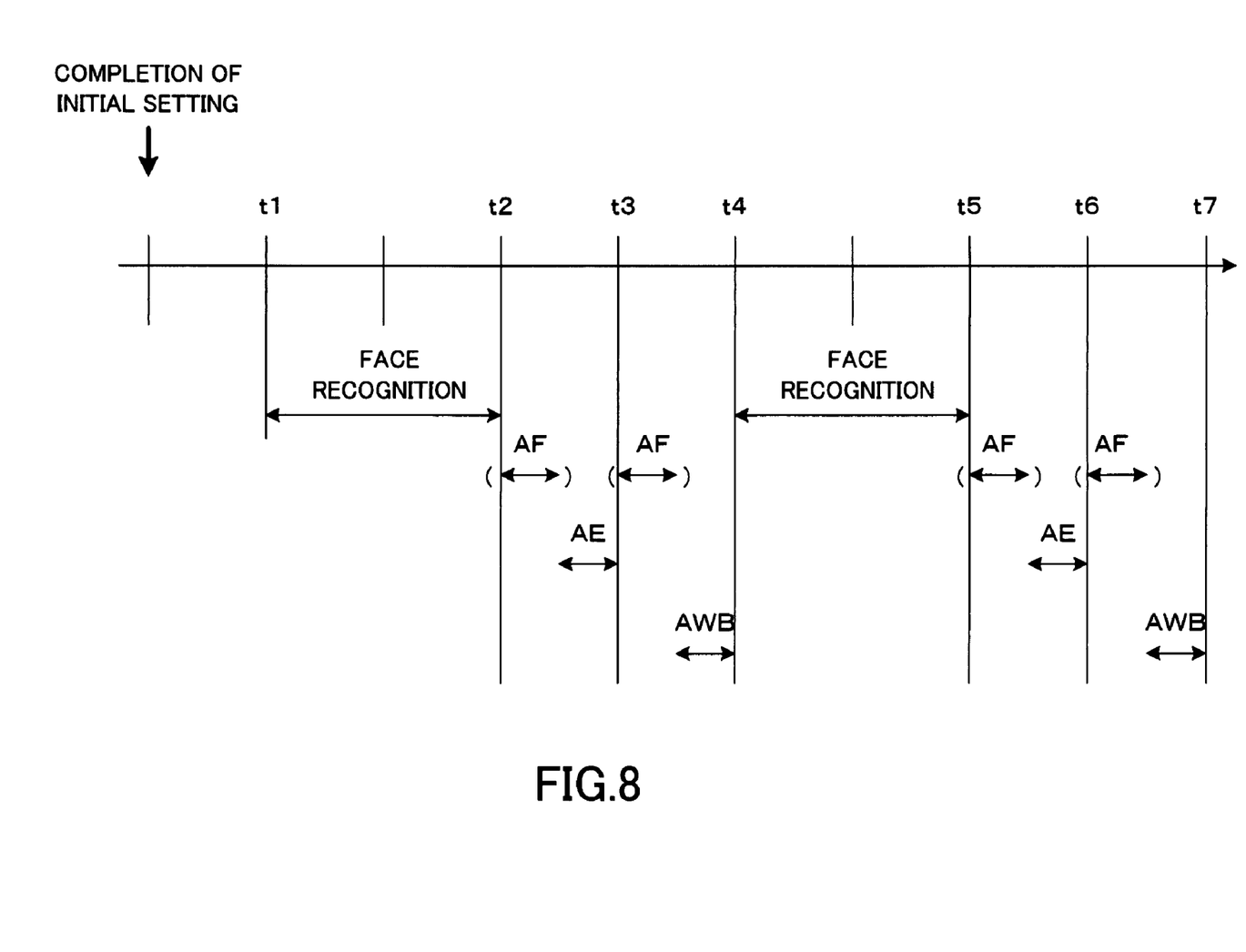
FIG. 8 represents a view describing actions of AF, AE and AWB when face recognition is possible.
Figure 9:
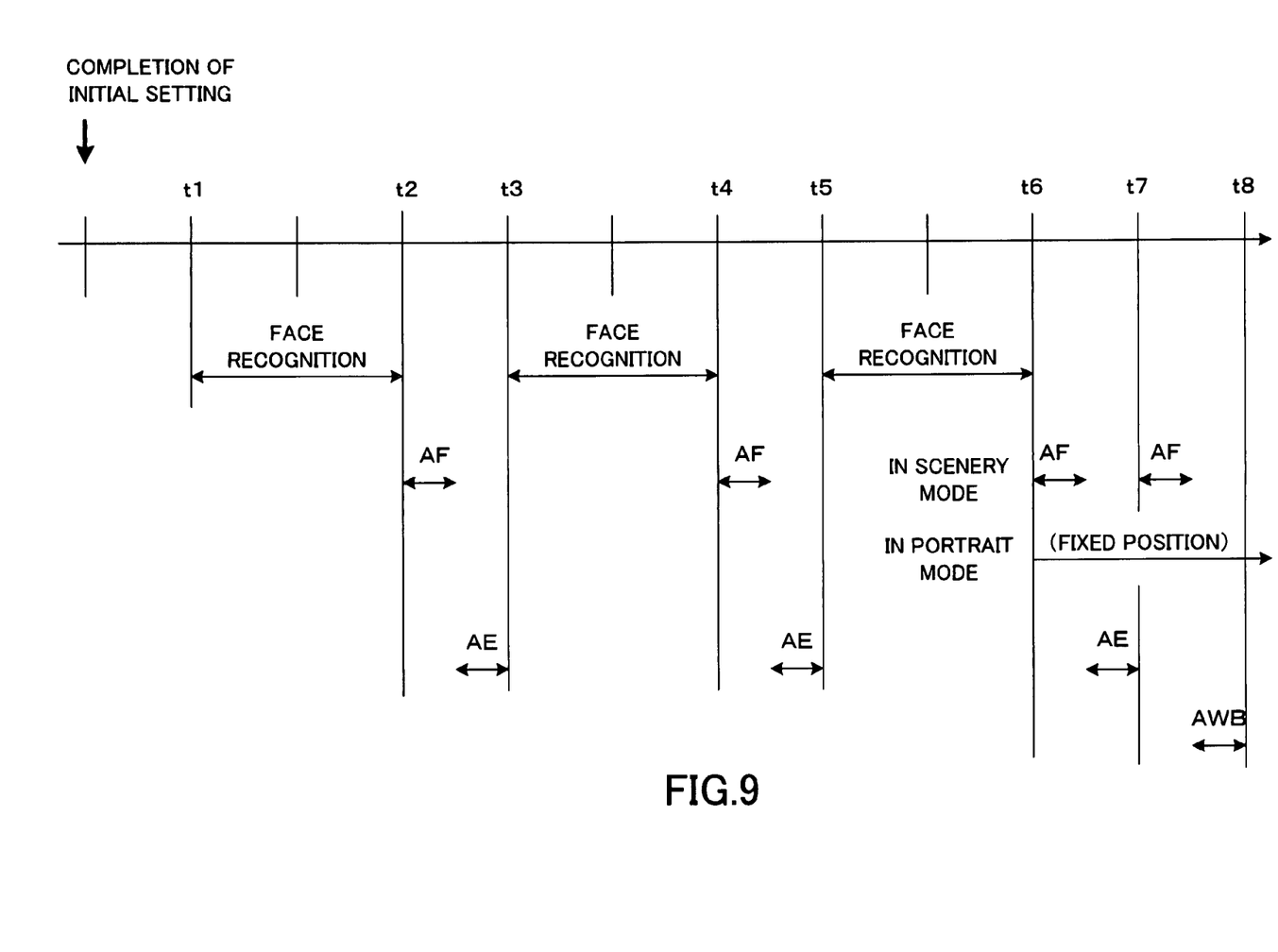
FIG. 9 represents a view describing actions of AF, AE and AWB when face recognition is impossible.

Referring to FIGS. 8 and 9, timing about the feature extraction, AE, AF and AWB will be described. FIG. 8 shows timing in a case where face recognition is possible from a camera operation start whereas FIG. 9 shows timing in the event that the face recognition is impossible. In both figures, a horizontal axis is a time axis on a basis of a cycle (e.g. 30 f/sec.) extracted from imaging element 103 and herein the face recognition process is supposed to be complete within two cycles. AF and AE computations and AF and AWB computations are implemented respectively in series within one cycle.

In FIG. 8, when a camera is actuated, firstly an aperture is stopped down so as to be a minimum aperture and the focus lens is moved to a hyperfocal distance position responsive to the minimum aperture. The hyperfocal distance position is a position from the nearest shooting distance from which depth of field of image-taking lens 101 extends through infinity. When shooting at this position, the depth of field extends over everything from half the hyperfocal distance to infinity. A fine detail of contents about an initial setting will be described later. The face recognition computation is started from time t1 by using data exposed with imaging element 103 after the initial setting is finished.

When the face recognition is possible, at time t2, the AF and AE computations are implemented with respect to predetermined scope inclusive of a recognized face by using output data thinned out for a motion image from imaging element 103. The focus lens is driven based upon this AF computation result and once the lens is focused, a driving range of the focus lens is limited to a predetermined range in the vicinity of the focused position from then on. With this, even if a subject moves and goes out of an AF area, an abrupt focusing on a backdrop can be avoided. Furthermore, when plural subjects present within a screen are moving, a primary subject to implement the AF computation varies with a change in a size and distance of each extracted subject and thereby there are cases where a frequent back-and-forth moving focus lens causes annoying. To avoid such annoyance, when the face recognition is possible, the AF computation may be implemented when the face recognition becomes impossible without a periodical AF computation. The AF computation in parentheses in FIG. 8 shows a case where the AF computation is not implemented like the foregoing. Subsequent to the AF computation, the AE computation is implemented and then the AF and AWB computations are implemented by using an output from imaging element 103 at time t3 after completion of the AE computation. The AF computation is implemented as needed in the same way as with a previous cycle. From time t4, a face recognition computation is implemented and after this, the same cycle will be repeated from time 1.

Next, an explanation about a case where face recognition is impossible will be given in reference to FIG. 9. The contents from the initial setting to face recognition finish time t2 is the same as in FIG. 8. When the face recognition is impossible, a movement range of the focus lens has no limit with respect to a result of an AF computation starting from time t2. Subsequent to the AF computation, an AE computation is implemented. A cycle from time t3 to time t5 is the same as the one from time t1 to time t3. The reason why such the same action is repeated is that the focus lens is caused to move based upon a result of the AF computation implemented between time t2 and time t3 and image data exposed by imaging element 103 between time t4 and time 5 after movement completion is used for face recognition process. When the face recognition is still impossible even with the image data after such the movement of the focus lens is complete, a shooting mode set on a camera at time t6 is checked. A detail of this shooting mode will be described later.

When a shooting mode with emphasis on a person is set, the focus lens is moved to the position of the hyperfocal distance as described before. Also, when a shooting mode with emphasis on scenery is set, the AF computation is implemented in the same way as the one at time t2 or time t4 and the focus lens is moved to a focus position based upon a result of the AF computation. In a cycle from time t7 when the AE computation is complete, the focus lens stays fixed at the position of the hyperfocal distance when the shooting mode with emphasis on a person is set, whereas, when the shooting mode with emphasis on scenery is set, a new AF computation is implemented. And then after the AWB computation is completed, the face recognition computation is implemented at time t8 and process from time t5 will be repeated from then on. When the face recognition becomes impossible because a subject moves during recognition process, process from time t2 and then on as shown in FIG. 8 will be repeated. When the face recognition becomes impossible because a subject moves during the feature extraction, process from time t2 and then on as shown in FIG. 9. In a description of FIG. 9, a cycle is started from time t2 in a case of the AWB computation, but the AWB computation may be implemented in a cycle at time t3 and time t5 after the AE computation is complete in the same way as in FIG. 8.

FIGS. 2 through 5 are flow charts organizing the series of action sequences as described in FIG. 9. In step S101 of FIG. 2, when a power-on of a digital camera is detected by turning power switch SW1161 on, it is judged in step S102 whether or not an action mode of the digital camera is set to a face recognition mode. This face recognition mode can be set by way of, for example, setting button 1164 as well. As described before, when the face recognition mode is set, the recognizable area indicated by the chain line as shown in FIG. 6 is displayed on monitor display 109. If the action mode is not set to the face recognition mode, a flow proceeds to step S103 where AF, AE and AWB actions are implemented in accordance with a predetermined sequence to execute a normal shooting action. When the action mode is set to the face recognition mode in step S102, a flow proceeds to step S104 where an initial setting for a face recognition process is input. A specific example of this initial setting will be described later.

Figure 2:
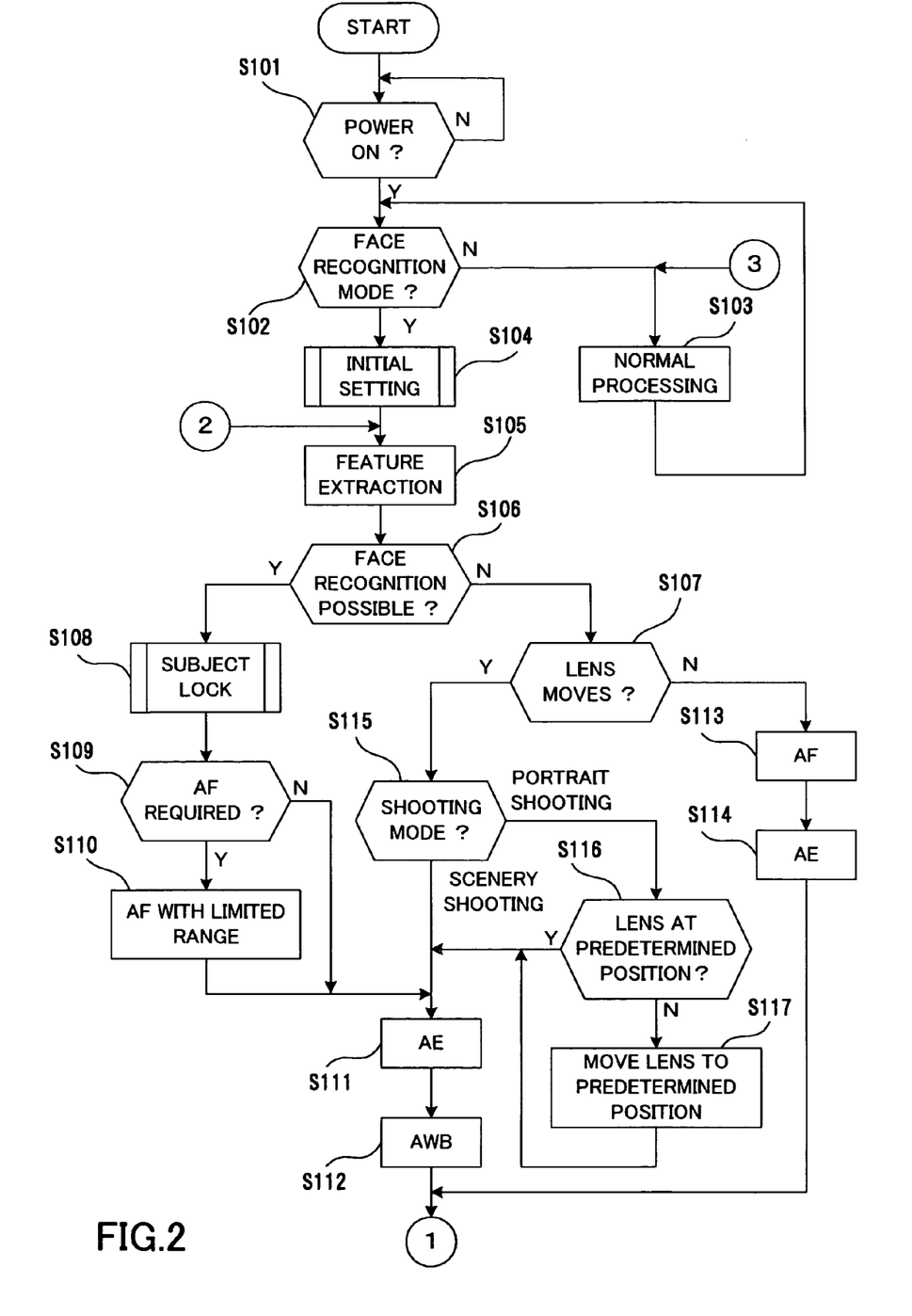
FIG. 2 represents a flow chart describing an action sequence of the digital camera according to the present invention.

After the initial setting is finished, in step S105, features of a subject are extracted with feature extraction computation section 1123 by using an exposed image data after completion of the initial setting. In step S106, CPU 112 judges whether or not a person's face is recognizable based upon the extracted features. When the face recognition is impossible, a flow proceeds to step S107, but when the face recognition is possible, a flow proceeds to step S108. In step S108, a subject lock is set to a primary subject that a photo shooter once sets. This locking is to permit the photo shooter to photograph readily from then on while following the subject. A setting of the subject lock will be described in detail referring to FIG. 5.

In step S109, it is judged whether or not the AF computation is required to be implemented the locked subject. In a normal case where the face recognition is not made, the AF computation has been implemented prior to AF and AWB computations, but as described in FIG. 8, what the face recognition is made means that the focus lens stays at a focus position or near its focus position, so the AF computation is not always required prior to AE and AWB computations and thus it is sufficient such that the AF computation is configured to be implemented once every two or three times of the AE and AWB computations. Or regardless of the number of the computation cycles, the AF computation may be implemented assuming that a deviation from a focus point is large when the focus evaluation value as described before is below a predetermined value. With such the reason, if the AF computation is not required, a flow proceeds to step S111, but when the AF computation is required, a flow proceeds to step S110 where the AF computation is implemented by limiting a movement range of the focus lens. This is based upon a supposition that the primary subject does not move overly from a present position if the subject moves. With such the limitation of the movement range of the focus lens, when the primary subject moves and goes out of the AF area, the focus lens can be prevented from moving excessively to focus on a backdrop depending upon a result of the AF computation. After completion of the AF computation, then, the AE computation is implemented in step S111 and in step S112, the AWB (automatic white balance) computation is implemented and then a flow moves on to step S118 of FIG. 8. As described in FIG. 8, the AF computation may be implemented prior to the AWB computation of step S112.

When it is judged that the face recognition is impossible in step S106, a flow proceeds to step S107. Herein, it is judged whether or not the focus lens is moved after the face recognition is judged to be impossible. Namely, it is judged whether or not the face recognition is judged to be impossible in step S106 subsequent to the focus lens movement. If the judgment is made before the focus lens is moved, a flow proceeds to step S113 where the AF computation is implemented and then, the AE computation is implemented in step S114 and a flow moves on to step S118 of FIG. 8. When it is judged once again that the face recognition is impossible after the focus lens is moved, a flow proceeds to step S115 where it is judged what a shooting mode is set to the digital camera. The shooting mode referred to herein is a shooting mode that places emphasis on a person like a portrait mode, a commemorative picture mode etc or a shooting mode that puts emphasis on scenery like a landscape mode, a night scene mode etc. It is judged what a mode is set. This mode is set via setting button 1164 while a user views a menu displayed on monitor display 109.

When the shooting mode is set to a mode with emphasis on a person, a flow proceeds to step S116 and it goes to step S111 when it is set to the mode with emphasis on scenery. As possible causes of the face recognition impossible although the shooting mode is set to the mode with emphasis on a person, it is presumed that the person happens to look aside or downward, so a latest position of the focus lens is checked in step S116 and a flow proceeds to step S111 when the lens stays at the hyperfocal distance and when the lens stays other than at the hyperfocal distance, a flow moves on to step S111 after the lens is moved to the position of the hyperfocal distance in step S116. As the position of the hyperfocal distance varies depending upon an aperture value of diaphragm 102 and a focal length of image-taking lens 101, in step S117, the focus lens may be configured to be moved to a fixed position (e.g. shooting distance at 2 m or so) not relying on an aperture value instead of the position of the hyperfocal distance. When the face recognition is judged to be impossible in step S106, it has been described so far that a flow is configured to proceed to step S107, but instead, a flow may be configured to get back to step S105. Namely, it is presumed that one-time judgment is not sufficient since a subject happens to look aside. Therefore, when the recognition is judged to be impossible, a flow gets back to step S105 and it is judged once again whether or not the recognition is possible, and a judgment may be configured such that the recognition is finally judged to be impossible when predetermined-times face recognitions are all impossible in a row. This enables an enhancement of an accuracy of the subject recognition.

Figure 3:
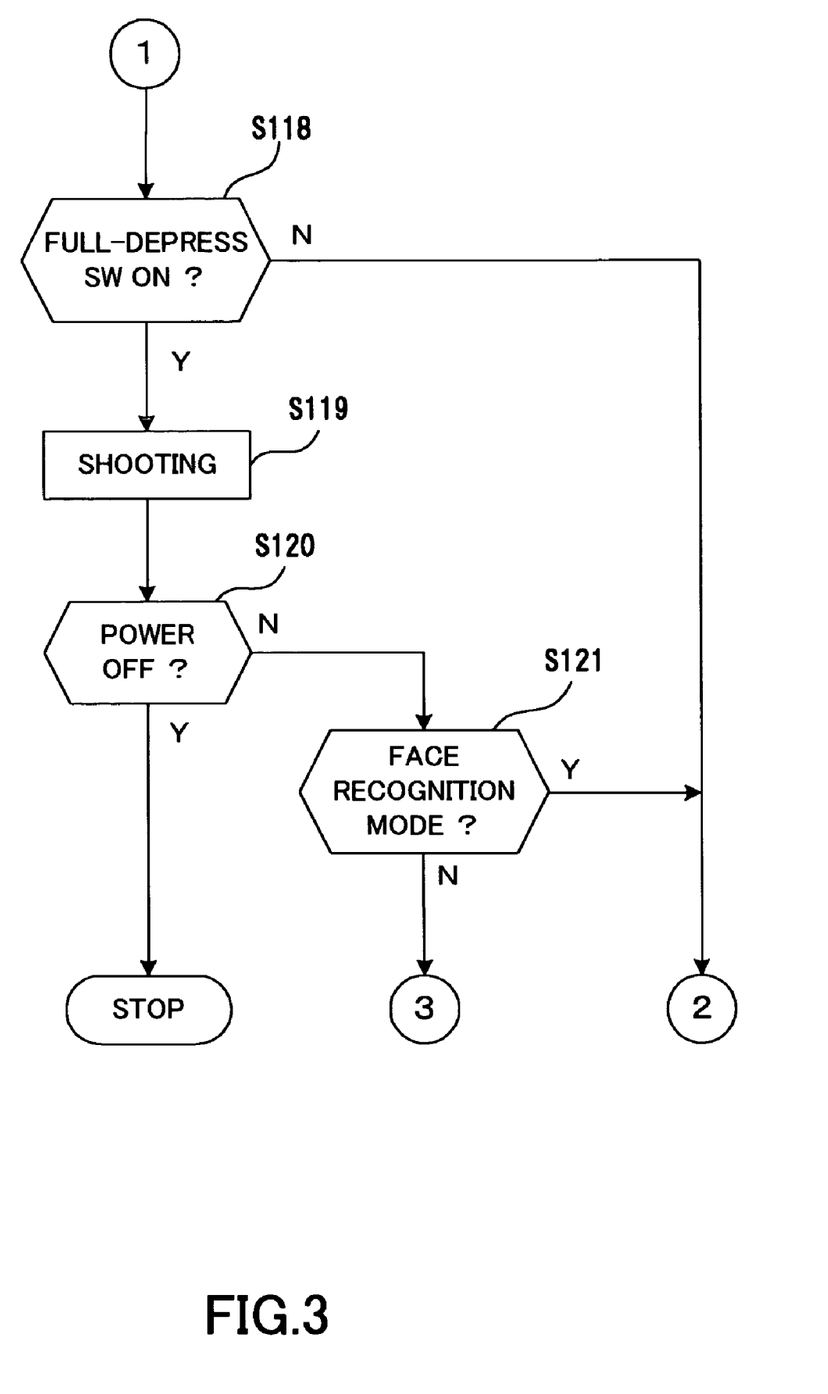
FIG. 3 represents a flow chart describing an action sequence of the digital camera according to the present invention.

When the mode is judged to be set to the landscape shooting mode in step S115, a flow proceeds to step S111 while keeping a position of the focus lens intact and the AE computation is implemented and then, in step S112, the AWB computation is implemented and a flow moves on to step S118 of FIG. 3. In step S118, it is checked whether or not full-depress shutter 1163 is depressed. When the shutter is not depressed, a flow gets back to step S105 of FIG. 2, but when the button is depressed, a flow proceeds to step S119 and then a subject is photographed. After this, it is checked whether or not a power of the camera is turned off in step S120 and when the power thereof is not turned off, a flow proceeds to step S121 and it is checked whether or not the face recognition mode setting is changed. When the mode setting remains unchanged, a flow gets back to step S105 of FIG. 2, but when the face recognition mode setting is changed, a flow gets back to step S103 of FIG. 3. When the camera power is turned off in step S120, series of shooting actions are finished in the face recognition mode.

Figure 4:
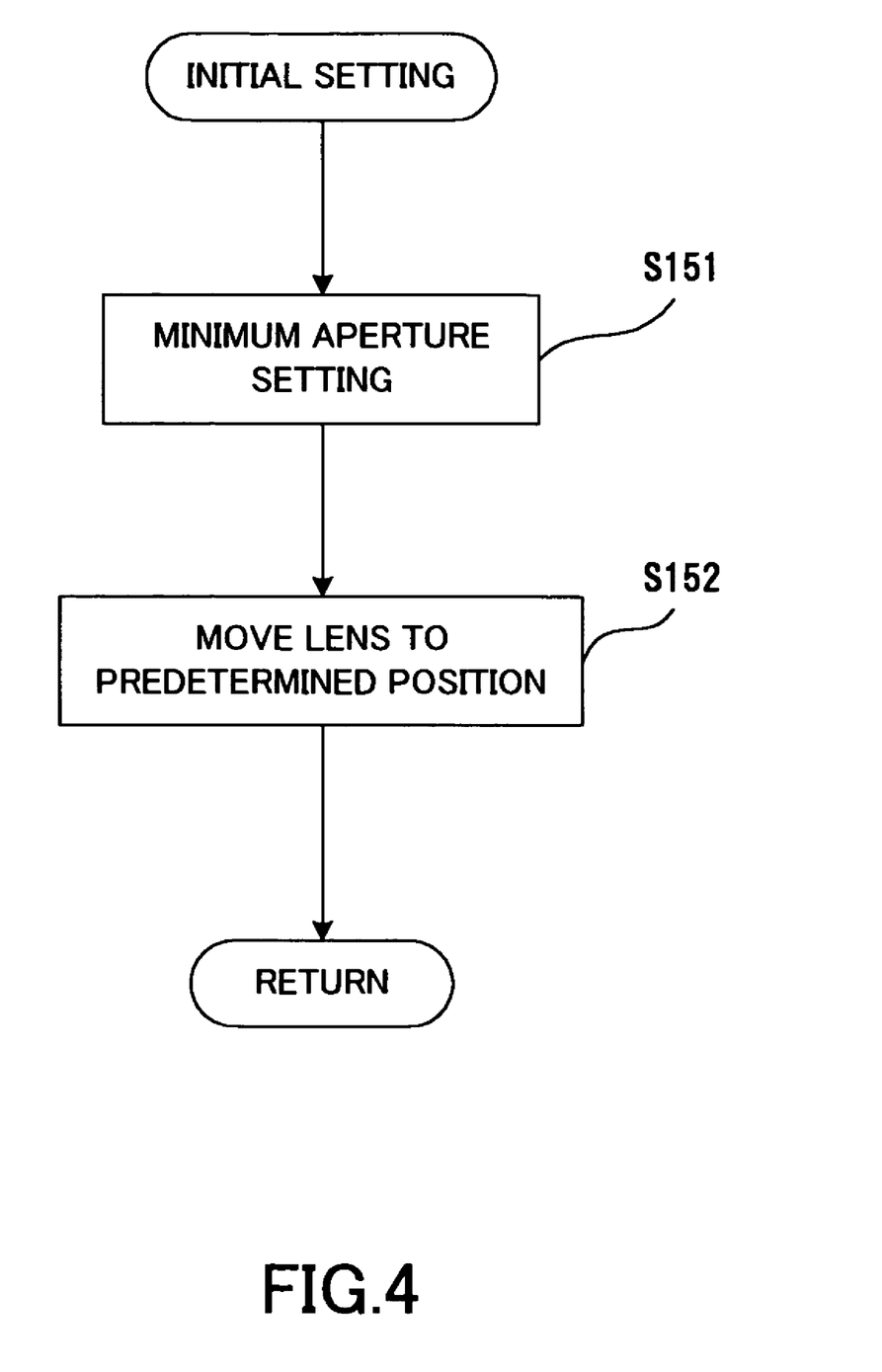
FIG. 4 represents a flow chart describing a sequence of an initial setting.

Specific contents of the initial setting will be described based upon FIG. 4. In this initial setting, positions of the focus lens and the aperture in a diaphragm are set. Firstly, in step S151, diaphragm 102 is set to a predetermined aperture value. Diaphragm 102 is usually set to the maximum aperture or near the maximum aperture at a time of turning the camera on. This is to focus on a specific subject readily by making depth of field shallow. Contrary to this, it is necessary that the depth of field be made deep whereby many subjects at a broad range be made recognizable in the face recognition mode. To this end, the aperture value is set to the minimum aperture or the vicinity of the minimum aperture. Then, in step S152, the focus lens is moved to the position of the hyperfocal distance as described before. In the contrast method AF action, wherein, when the power is turned on, usually, the focus lens is scanned over a predetermined range whereby a peak value of the evaluation value is detected. On the other hand, the face recognition action has a priority over the AF action in the face recognition mode. Therefore, when the focus lens has come to a stop at the closest distance or an infinity position due to causes of some kind, a person becomes overly out of focus so that the face recognition might become impossible. In this way, movement of the focus lens to the position of the hyperfocal distance enables to obtain image data focused on a subject from the beginning of the camera action and thus the face recognition can be quickly made. It is necessary that the position of the hyperfocal distance be computed based upon a focal length or an aperture of a lens, but if this computation is annoying, the image-taking lens may be caused to be moved to a predetermined position beforehand that is not based upon the lens. Specifically, the predetermined position is a fixed position within 0.3 to 3 m.

That is all for the initial setting, but in addition to this setting, the AE computation may be implemented. The reason for this is that the face recognition becomes impossible when subject brightness is too much or too dark to get shooting data. Therefore, prior to the face recognition action, first, the subject brightness is measured with AE computation section 1121 and the aperture or a shutter speed is adjusted such that the subject brightness becomes acceptable to some degree. Needless to say, in this initial setting, these three methods are not necessarily implemented as described herein and one or several combinations of the three methods may be selected as needed and implemented.

Figure 5:
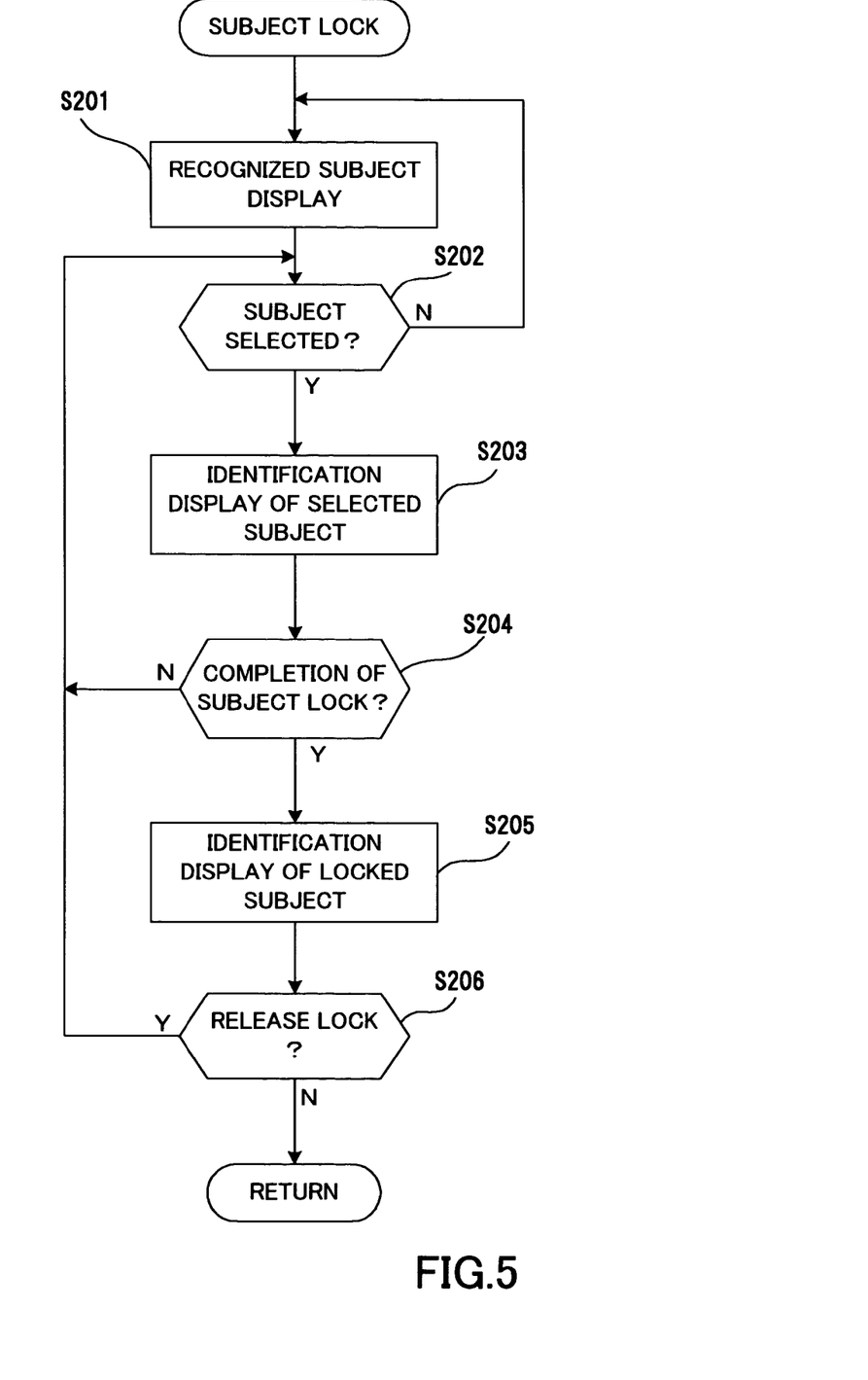
FIG. 5 represents a flow chart describing a sequence of a subject lock.

Referring to FIG. 5, a detail of the subject lock of step S108 in FIG. 2 will be described. In step S201, a recognized subject is displayed as an identification display by a predetermined display method. FIG. 6 shows one of examples of an embodiment of this display. FIG. 6 shows that displays with squares of a thin solid line and a dotted line inside a face are recognized faces. Herein, it is shown that, of these displays, the face with the dotted line is the largest face. Other than this, by computing a rough distance to a subject on a basis of the width between eyes as described before, a face at the closest distance may be displayed as an identification display from a result of the computation. Whether the largest or the closest face is displayed as an identification display is set via setting button 1164.

In step S202, it is judged whether or not a photo shooter selects a desired subject. When the photo shooter does not select, a flow gets back to step S201, but when the photo shooter selects, in step S203, the thin solid line display of the selected face makes the dotted line display. In step S204, it is judged whether or not the selected subject is locked. More specifically, after the subject is selected, depressing of setting button 1164 sets the subject to the subject being locked. With this, the selected subject is always set up as AF or AE area and thereby the AF and AE areas are prevented from moving to the other subject rather than the locked subject even if other subject becomes closer or larger since the locked subject moves.

When the subject is not locked, a flow gets back to step S202 and a selection of a subject is repeated. When the subject lock is finished, in step S205, by changing over from the square broken line display of the locked subject to the square tick solid line display thereof, it is displayed as the identification display that the subject is being locked. In step S206, it is judged whether or not the once set lock is released. The lock can be released by another depressing of setting button 1164. With this, the thick solid line display is changed to the broken line display whereby it is shown that the subject lock is released. When the subject lock is released, a flow gets back to step S202, but when the subject lock is not released, this subject lock process is ended. Herein, a sign of subject identification is denoted by the square solid line, broken line and thick solid line and the sign may be distinguished from the subject lock identification and the face recognition identification by changing a color like red, blue etc, a shape such as a square, triangle, circle etc or pointing a locked subject with an arrow.

DENOTE OF SYMBOLS

101 IMAGE-TAKING LENS
102 DIAPHRAGM
103 IMAGING ELEMENT
104 ANALOGUE SIGNAL PROCESSING SECTION
105 BUFFER MEMORY
106 DIGITAL SIGNAL PROCESSING SECTION
108 D/A CONVERTER
109 LCD MONITOR
110 STORAGE AND REPRODUCTION SIGNAL PROCESSING SECTION
111 EXTERNAL STORAGE DEVICE
112 CPU
113 LENS DRIVE MEMBER
114 APERTURE DRIVE MEMBER
115 IMAGING ELEMENT DRIVE MEMBER
116 OPERATION MEMBER
117 STROBE
121 LENS POSITION DETECTOR
135 A/D CONVERTER
1121 AE COMPUTATION SECTION
1122 AWB COMPUTATION SECTION
1123 FEATURE EXTRACTION COMPUTATION SECTION
1124 AF COMPUTATION
1125 STORAGE SECTION
1161 POWER SWITCH
1162 HALF-DEPRESS SWITCH
1163 FULL-DEPRESS SWITCH
1164 SETTING BUTTON
1165 UP&DOWN SWITCH

What is claimed is:

1. A digital camera comprising:
an imaging device that photographs a subject;
a storage control device that causes a first storage device to store image data output from the imaging device at a first time interval;
a display control device that reads the image data stored in the first storage device at the first time interval and causes a display device to display the image data;
wherein the storage control device continuously reads the image data stored in the first storage device at a constant rate of a second time interval and causes a second storage device to store the image data at the second time interval; and
an extraction device that extracts a feature section of the subject, based on the image data stored in the second storage device.

2. The digital camera according to claim 1, further comprising:
a directing device that directs to thin out image data and store the thinned-out image data such that the number of pixels of the image data makes a predetermined number of pixels determined by a number of display pixels of the display device when the image data output from the imaging device is stored in the first storage device.

3. The digital camera according to claim 1 further comprising:
a directing device that directs to store only a predetermined scope on the second storage device out of image data stored in the first storage device when the image data read out from the first storage device is stored in the second storage device.

4. The digital camera according to claim 1, wherein the first time interval and the second time interval are equal.

5. The digital camera according to claim 1, wherein the first time interval is shorter than the second time interval.

6. The digital camera according to claim 1 further comprising:
an exposure computation device that computes an exposure when photographing a subject, wherein the exposure computation device implements an exposure computation with respect to a subject responsive to a feature section extracted by the extraction device.

7. The digital camera according to claim 6, wherein the exposure computation device implements an exposure computation with respect to a subject responsive to the feature section extracted by the extraction device based upon image data output from the imaging device after completion of an extraction action by the extraction device.

8. The digital camera according to claim 1 further comprising:
a detection device that detects a color condition on a screen to be photographed, wherein the detection device detects a color condition on the screen after completion of an extraction action by the extraction device.

9. The digital camera according to claim 8, wherein the detection device detects a color condition on the screen based upon image data output from the imaging device after completion of an extraction action by the extraction device.

10. The digital camera according to claim 1 further comprising:
a distance computation device that computes a distance up to a subject, wherein the distance computation device computes a distance up to a subject responsive to a feature section extracted by the extraction device after completion of an extraction action by the extraction device.

11. The digital camera according to claim 10, wherein the distance computation device computes a distance up to a subject responsive to the feature section based upon image data output from the imaging device after completion of an extraction action by the extraction device.

12. A digital camera comprising:
a lens drive device that drives a image-taking lens photographing a subject;
a feature extraction device that extracts a feature section of a subject from image data at a predetermined time interval;
a setting device that sets information about a subject to be photographed beforehand;
a judgment device that judges whether or not the feature extraction device can extract a feature section of the subject; and
a directing device that directs the lens drive device to change a drive method of the image-taking lens based upon a setting result of the setting device when the judgment device judges that a feature section of the subject cannot be extracted, wherein
the judgment device judges that a feature section of the subject cannot be extracted when a feature section of the subject cannot be extracted consecutively at a plurality of times.

13. The digital camera according to claim 12, wherein
the information about a subject to be photographed is information on whether a shooting is with emphasis on a person or scenery,
the directing device directs to drive the image-taking lens to a predetermined position set beforehand when a shooting with emphasis on a person is set by the setting device, and the predetermined position is a position of a hyperfocal distance of the image-taking lens, namely, the nearest shooting distance of the image-taking lens where infinity extends through depth of field of the image-taking lens.

14. The digital camera according to claim 12 further comprising:

a distance measurement device that measures a distance up to a subject, wherein the directing device directs to drive the image-taking lens to a position responsive to a distance measurement result of the distance measurement device when a shooting with emphasis on scenery is set by the setting device.

15. A digital camera comprising:

an imaging device that photographs a subject;

a storage control device that causes a first storage device to store image data output from the imaging device at a first time interval;

a display control device that reads the image data stored in the first storage device at the first time interval and causes a display device to display the image data;

wherein the storage control device reads the image data stored in the first storage device at a second time interval and causes a second storage device to store the image data; and an extraction device that extracts a feature section of the subject, based on the image data stored in the second storage device, wherein the first storage device is part of the second storage device.

* * * * *